(12) United States Patent
Rawlinson et al.

(10) Patent No.: US 8,336,658 B2
(45) Date of Patent: Dec. 25, 2012

(54) AUGMENTED VEHICLE SEAT MOUNT

(75) Inventors: Peter Dore Rawlinson, Playa Del Rey, CA (US); Alan Paul Clarke, Redondo Beach, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/328,615

(22) Filed: Dec. 16, 2011

(65) Prior Publication Data
US 2012/0161429 A1 Jun. 28, 2012

Related U.S. Application Data

(63) Continuation-in-part of application No. 13/308,300, filed on Nov. 30, 2011.

(60) Provisional application No. 61/426,254, filed on Dec. 22, 2010.

(51) Int. Cl.
*H01M 2/38* (2006.01)

(52) U.S. Cl. ........... 180/68.5; 180/65.1; 429/96; 429/99

(58) Field of Classification Search ................. 180/65.1, 180/68.5; 429/96, 99, 148
See application file for complete search history.

(56) References Cited

U.S. PATENT DOCUMENTS

| 4,262,963 | A | | 4/1981 | Bauer et al. | |
| 4,526,424 | A | | 7/1985 | Korth | |
| 4,784,434 | A | | 11/1988 | Iwami | |
| 4,818,022 | A | | 4/1989 | Nishimura | |
| 5,322,348 | A | | 6/1994 | Johnson | |
| 5,392,873 | A | * | 2/1995 | Masuyama et al. | 180/68.5 |
| 5,639,571 | A | * | 6/1997 | Waters et al. | 429/71 |
| 5,653,506 | A | | 8/1997 | Wisner et al. | |
| 5,672,920 | A | * | 9/1997 | Donegan et al. | 307/147 |
| 6,094,927 | A | * | 8/2000 | Anazawa et al. | 62/239 |
| 6,811,186 | B1 | | 11/2004 | Fraley et al. | |
| 7,048,321 | B2 | * | 5/2006 | Bandoh et al. | 296/37.8 |
| 7,066,521 | B2 | | 6/2006 | Jung et al. | |
| 7,128,999 | B1 | * | 10/2006 | Martin et al. | 429/99 |
| 7,507,499 | B2 | * | 3/2009 | Zhou et al. | 429/99 |
| 7,654,352 | B2 | * | 2/2010 | Takasaki et al. | 180/68.5 |
| 7,780,230 | B2 | | 8/2010 | Serber | |
| 7,887,094 | B2 | | 2/2011 | Sakaida | |
| 2007/0238016 | A1 | * | 10/2007 | Takamatsu | 429/120 |
| 2009/0186266 | A1 | * | 7/2009 | Nishino et al. | 429/120 |
| 2009/0242299 | A1 | * | 10/2009 | Takasaki et al. | 180/68.5 |
| 2010/0175940 | A1 | * | 7/2010 | Taneda et al. | 180/68.5 |

* cited by examiner

*Primary Examiner* — Toan To
(74) *Attorney, Agent, or Firm* — Patent Law Office of David G. Beck

(57) ABSTRACT

A vehicle seat mounting assembly is provided in which the seat mounts are attached to body cross-members that are, in turn, mechanically coupled to battery pack cross-members contained within a battery pack enclosure mounted under the vehicle.

23 Claims, 13 Drawing Sheets

AUGMENTED VEHICLE SEAT MOUNT

CROSS-REFERENCE TO RELATED APPLICATION

The present application is a continuation-in-part of U.S. patent application Ser. No. 13/308,300, filed 30 Nov. 2011, and claims benefit of the filing date of U.S. Provisional Patent Application Ser. No. 61/426,254, filed Dec. 22, 2010, the disclosures of which are incorporated herein by reference for any and all purposes.

FIELD OF THE INVENTION

The present invention relates generally to vehicle structures and, more particularly, to means for enhancing the performance of vehicle seat mounts.

BACKGROUND OF THE INVENTION

Modern vehicles use a variety of structures to protect the vehicle's occupants during a crash. Some of these structures are used to control the transmission of the crash energy into the passenger compartment while other structures, such as seat belts, head restraints, and air bags, are intended to restrain passenger movement during a crash, thereby preventing the passengers from hurting themselves as their bodies react to the crash forces. At the heart of most, if not all, vehicle passenger safety features is a rigid and strong seat mounting assembly.

Conventional vehicle seats are attached to the vehicle floor panel. Examples of such seat mounting assemblies are shown in U.S. Pat. Nos. 4,262,963, 4,526,424, 4,784,434, 4,818,022, 5,322,348 5,653,506, 6,811,186, 7,066,521, 7,780,230 and 7,887,094. While this approach to mounting a vehicle seat has proven to be adequate, an improved seat mounting assembly is desired in order to achieve improved structural characteristics. The present invention provides such an improved seat mounting assembly.

SUMMARY OF THE INVENTION

The present invention provides a vehicle seat mounting assembly comprising (i) a battery pack enclosure that includes an enclosure top panel, an enclosure bottom panel, and a plurality of enclosure side members, where the battery pack enclosure is configured to hold a plurality of batteries, where the battery pack is mounted between and mechanically coupled to a first vehicle structural side member (e.g., left side rocker panel) located adjacent to a first side of the vehicle and a second vehicle structural side member (e.g., right side rocker panel) located adjacent to a second side of the vehicle, where the battery pack enclosure is mounted under a passenger cabin floor panel, where the battery pack enclosure includes a plurality of battery pack cross-members integrated into the battery pack enclosure, where each of the plurality of battery pack cross-members transverses the distance between a first enclosure side member adjacent to the first vehicle structural side member and a second enclosure side member adjacent to the second vehicle structural side member, and where the plurality of battery pack cross-members segregate the plurality of batteries into groups of batteries; (ii) at least one body cross-member mounted between and mechanically coupled to a third vehicle structural side member (e.g., left side rocker panel) located adjacent to the first side of the vehicle and a fourth vehicle structural side member (e.g., right side rocker panel) located adjacent to the second side of the vehicle, where the at least one body cross-member is mechanically coupled to the corresponding battery pack cross-member; and (iii) a plurality of vehicle seat mounts mechanically coupled to the at least one body cross-member, where at least one vehicle seat is mechanically attached to the plurality of vehicle seat mounts. The at least one body cross-member may be welded to the vehicle structural side members (e.g., rocker panels); the battery pack enclosure may be bolted to the vehicle structural side members (e.g., rocker panels); the body cross-member may be bolted to the battery pack cross-member; a plurality of metal sleeve members may be coupled to (for example by welding, brazing, soldering or bonding) the enclosure bottom panel, where the sleeve members extend from the enclosure bottom panel to the enclosure top panel, where the sleeve members pass through the corresponding battery cross-member, and where bolts pass through the metal sleeve members in order to bolt the body cross-member to the corresponding battery pack cross-member; a plurality of spacers may be interposed between the battery pack enclosure and the at least one body cross-member; the at least one body cross-member may include a plurality of threaded sleeve members to which the vehicle seat mounts are bolted; the vehicle seat mounts may be comprised of vehicle seat rails; and the assembly may include at least one vehicle seat belt that is mechanically coupled to a corresponding body cross-member or to at least one of the vehicle seat mounts.

The battery pack cross-members may be comprised of upper and lower members; the battery pack cross-members may be comprised of upper and lower members each of which includes at least one cavity extending throughout the member's length; the battery pack cross-members may be comprised of upper and lower members where the upper members are mechanically coupled to the enclosure top panel and the lower members are mechanically coupled to the enclosure bottom panel; and the battery pack cross-members may be fabricated from aluminum, an aluminum alloy or steel.

The battery pack enclosure may be substantially airtight; may be fabricated from aluminum, an aluminum alloy or steel; may have the enclosure bottom panel welded, brazed, soldered or bonded to the plurality of enclosure side members; and may have the enclosure top panel bolted to the plurality of enclosure side members.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within an enclosure, the individual batteries electrically interconnected to achieve the desired voltage and capacity for a particular application. As such, the terms "battery pack" and "battery pack enclosure" may be used interchangeably herein. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 1:
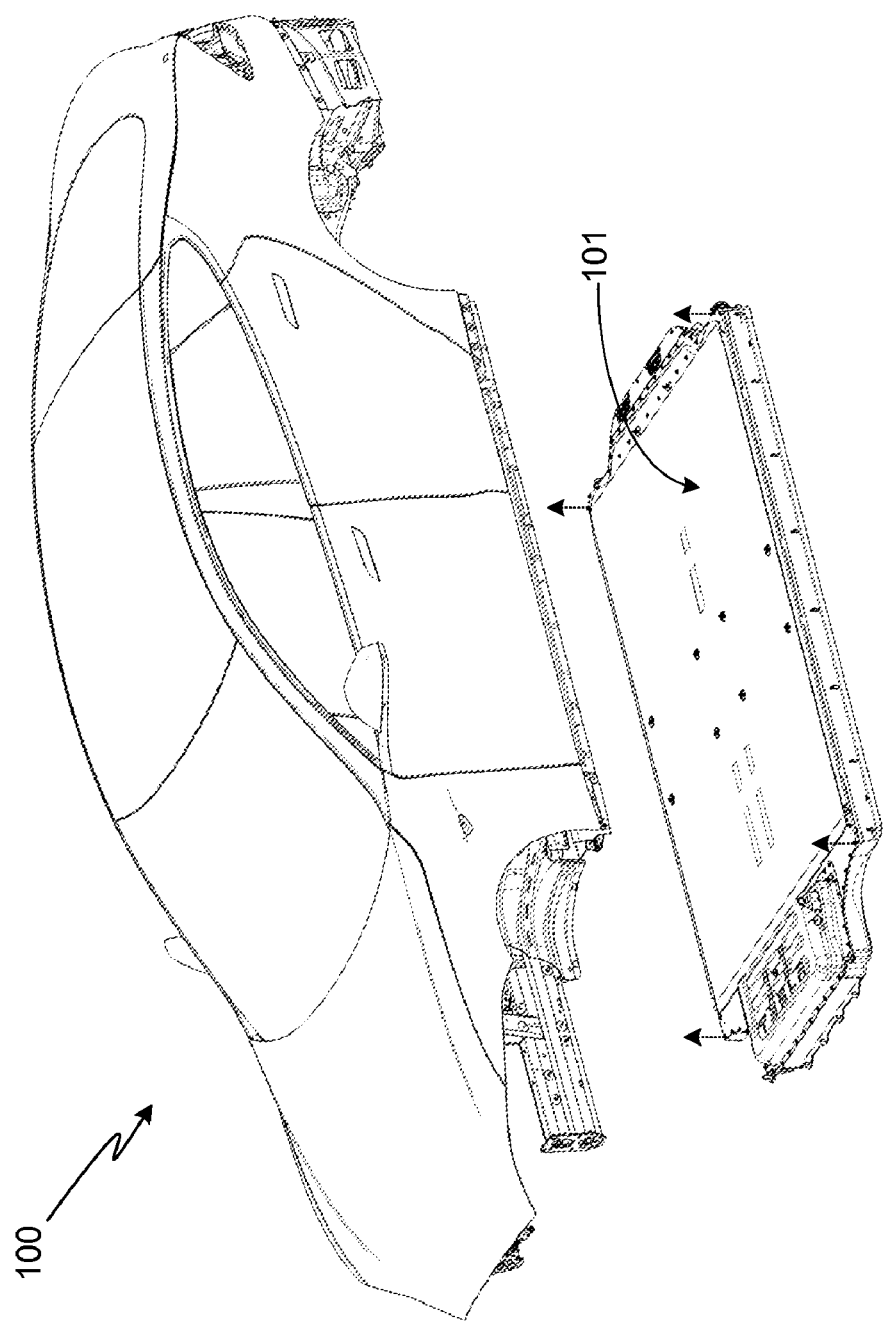
FIG. 1 provides a perspective view of a portion of a vehicle body and frame with the battery pack separated from the structure.
Figure 2:
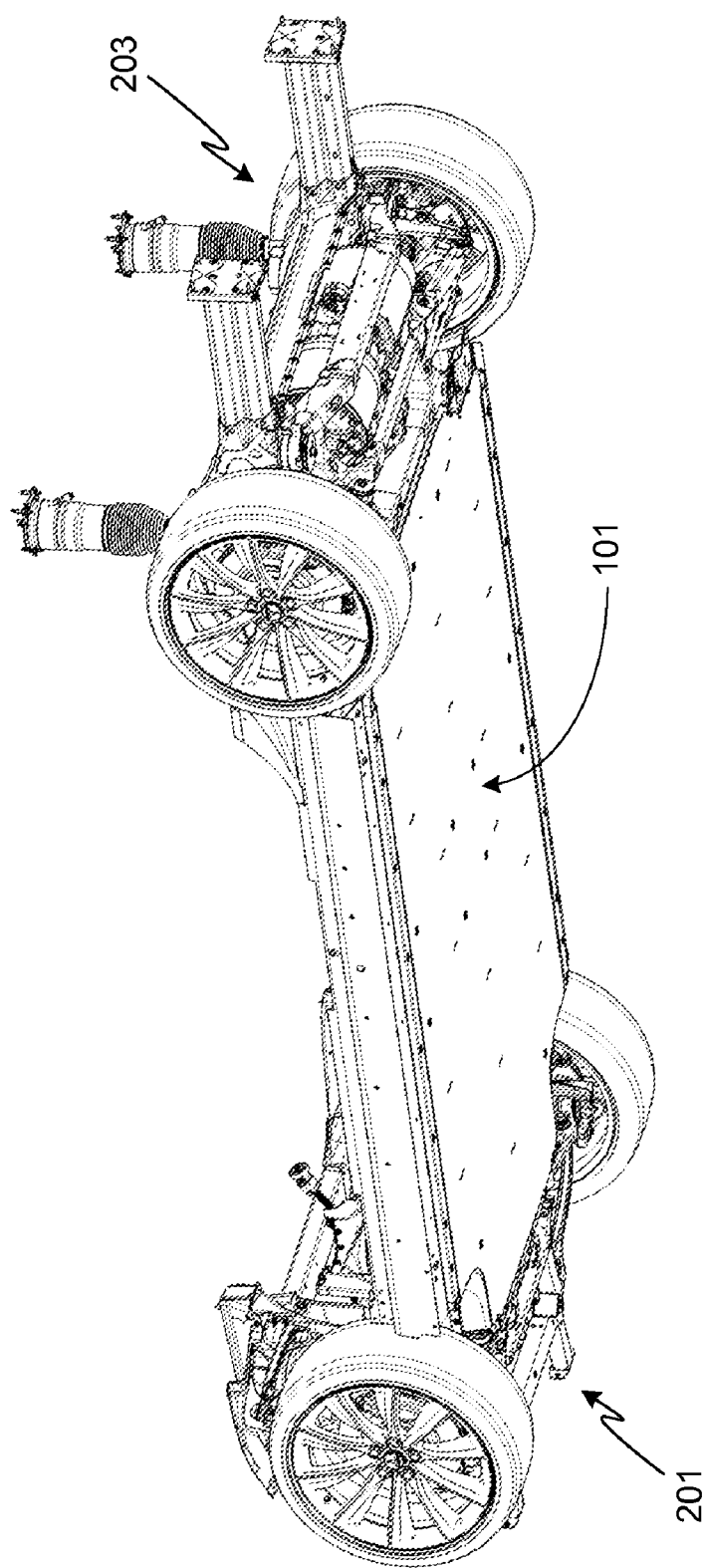
FIG. 2 provides a perspective view of a vehicle's undercarriage with the battery pack incorporated into the vehicle structure.
Figure 3:
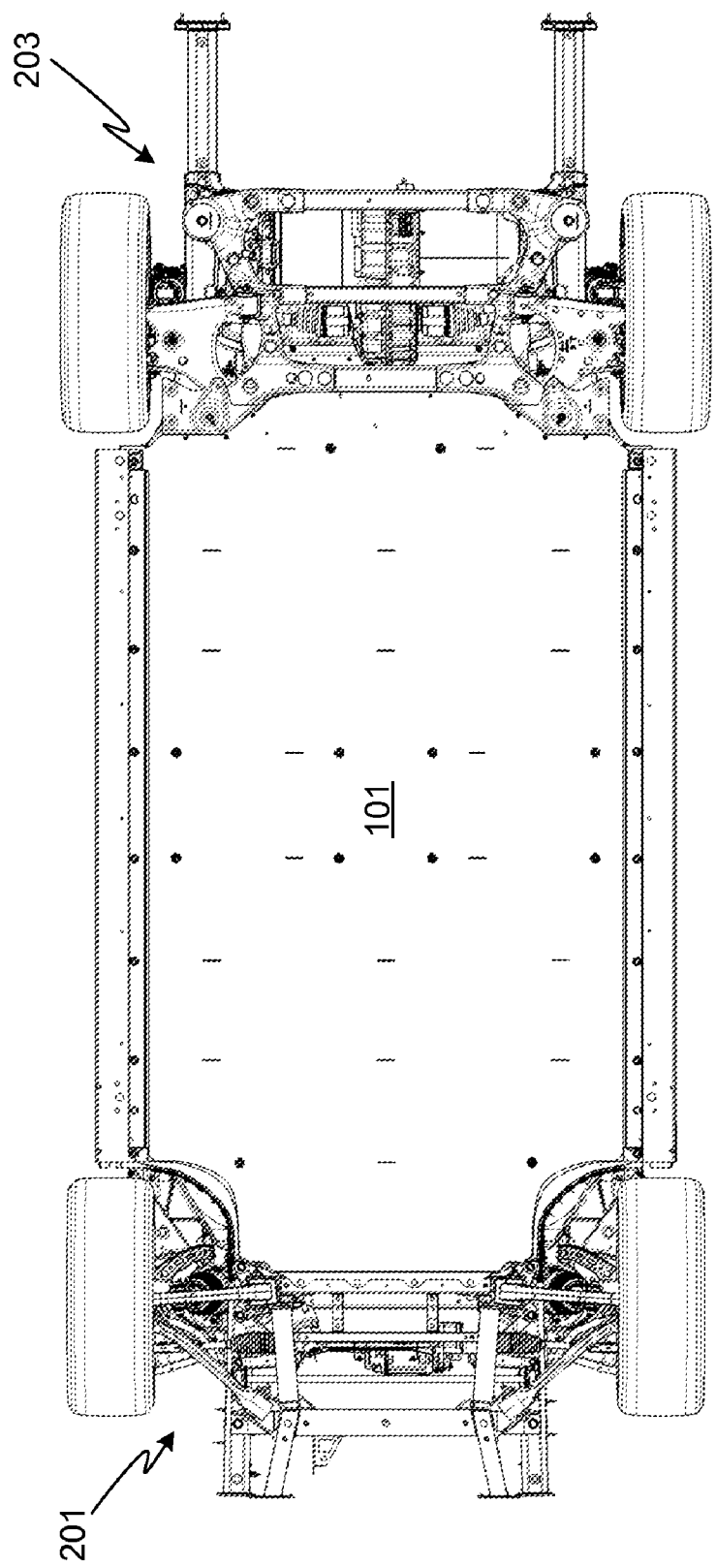
FIG. 3 provides a simplified bottom view of an electric vehicle with a battery pack incorporated into the vehicle structure.

In accordance with the present invention, and as illustrated in FIGS. 1-3, a battery pack 101 is mounted under the floor panel of an electric vehicle 100. Preferably the battery pack is integrated within the vehicle's structural frame, thus utilizing the battery pack's inherent rigidity and strength to enhance the overall performance and impact resistance of vehicle 100. In the illustrated embodiment, battery pack 101 not only transverses the width of the vehicle, i.e., from rocker panel to rocker panel, but also extends most of the distance between the front suspension 201 and the rear suspension 203. It will be appreciated that while smaller battery packs mounted under the vehicle's floor panel(s) may be used with the invention, such smaller packs will typically not provide the same level of vehicle performance enhancement as that provided by the preferred battery pack. In the illustrated embodiment, battery pack 101 is approximately 2.7 meters long and 1.5 meters wide and has a thickness that varies between approximately 0.1 meters to 0.18 meters, the thicker dimension applicable to those portions of the battery pack in which battery modules are stacked one on top of another.

Figure 4:
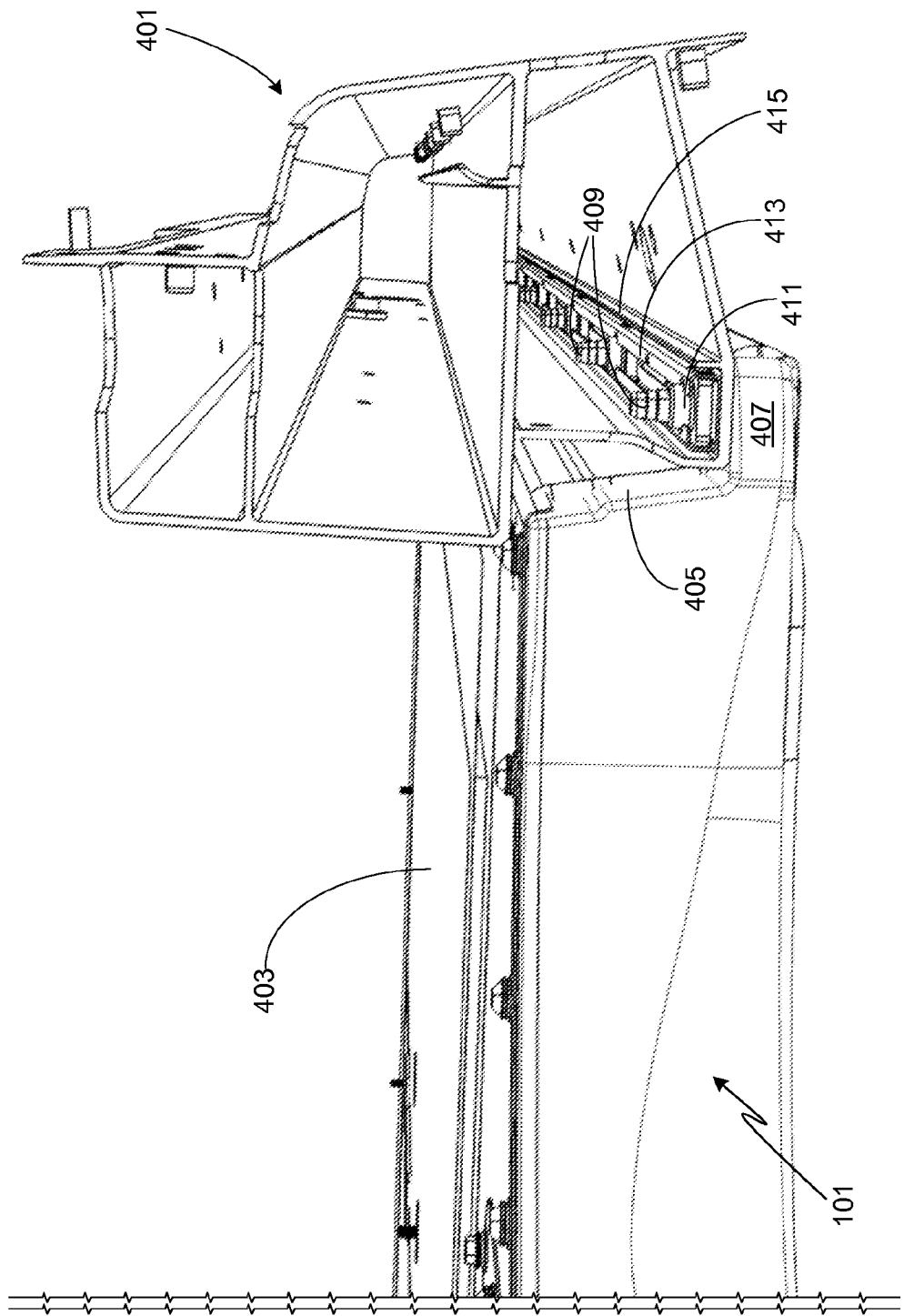
FIG. 4 provides a perspective view of a battery pack to rocker panel assembly.

As noted above, preferably battery pack 101 is configured to transverse the width of the vehicle and be coupled to the rocker panels located on either side of the vehicle. FIG. 4 illustrates an exemplary technique for attaching battery pack 101 to rocker panel 401, this figure showing the location of battery pack 101 under vehicle floor panel 403. Preferably rocker 401 is extruded, for example using an aluminum or aluminum alloy extrusion as described in detail in co-pending U.S. patent application Ser. No. 13/308,206, filed 30 Nov. 2011, and attached to the battery pack as described in co-pending U.S. patent application Ser. No. 13/308,300, filed 30 Nov. 2011, the disclosures of which are incorporated herein for any and all purposes. In general and as illustrated for the preferred embodiment, battery pack enclosure 101 includes side members 405 that include a mounting flange. In the illustrated embodiment, the mounting flange is an extended mounting region 407 that is positioned under rocker 401. Region 407 is perforated in order to allow passage of a plurality of mounting bolts 409. Mounting bolts 409, in combination with nuts 411, mechanically couple extended region 407 of battery pack 101 to rocker 401. To simplify assembly, channel nuts 411 are held in place during vehicle assembly using a channel nut retainer 413. Retainer 413 is positioned within rocker 401 using internal feature 415, thereby simplifying vehicle assembly and reducing manufacturing costs. It will be understood that other techniques may be used to mount the battery pack under the vehicle's floor panel.

Figure 5:
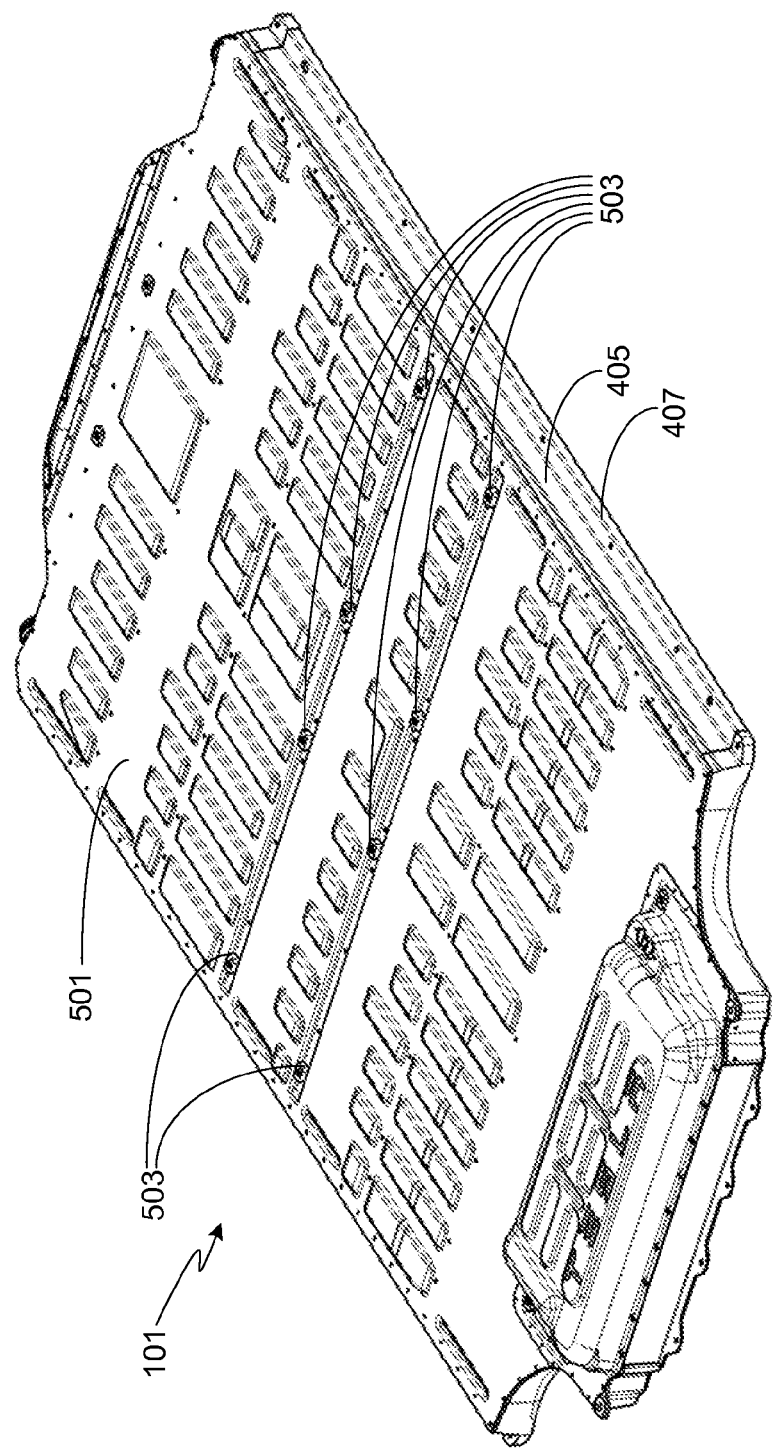
FIG. 5 provides a perspective view of the battery pack shown in FIGS. 1-4.

FIG. 5 provides a perspective view of battery pack 101 with the top enclosure panel 501 in place, panel 501 preferably providing a substantially airtight seal. Side structural elements 405, which are preferably hollow or include multiple cavities, are also visible as is battery pack mounting flange 407 that is used to mechanically and thermally couple the battery pack enclosure to the vehicle structure (not shown in this figure). Additionally, a plurality of mounts 503 is shown, mounts 503 being used to couple the seat assemblies to internal battery pack cross-members as described below.

Figure 6:
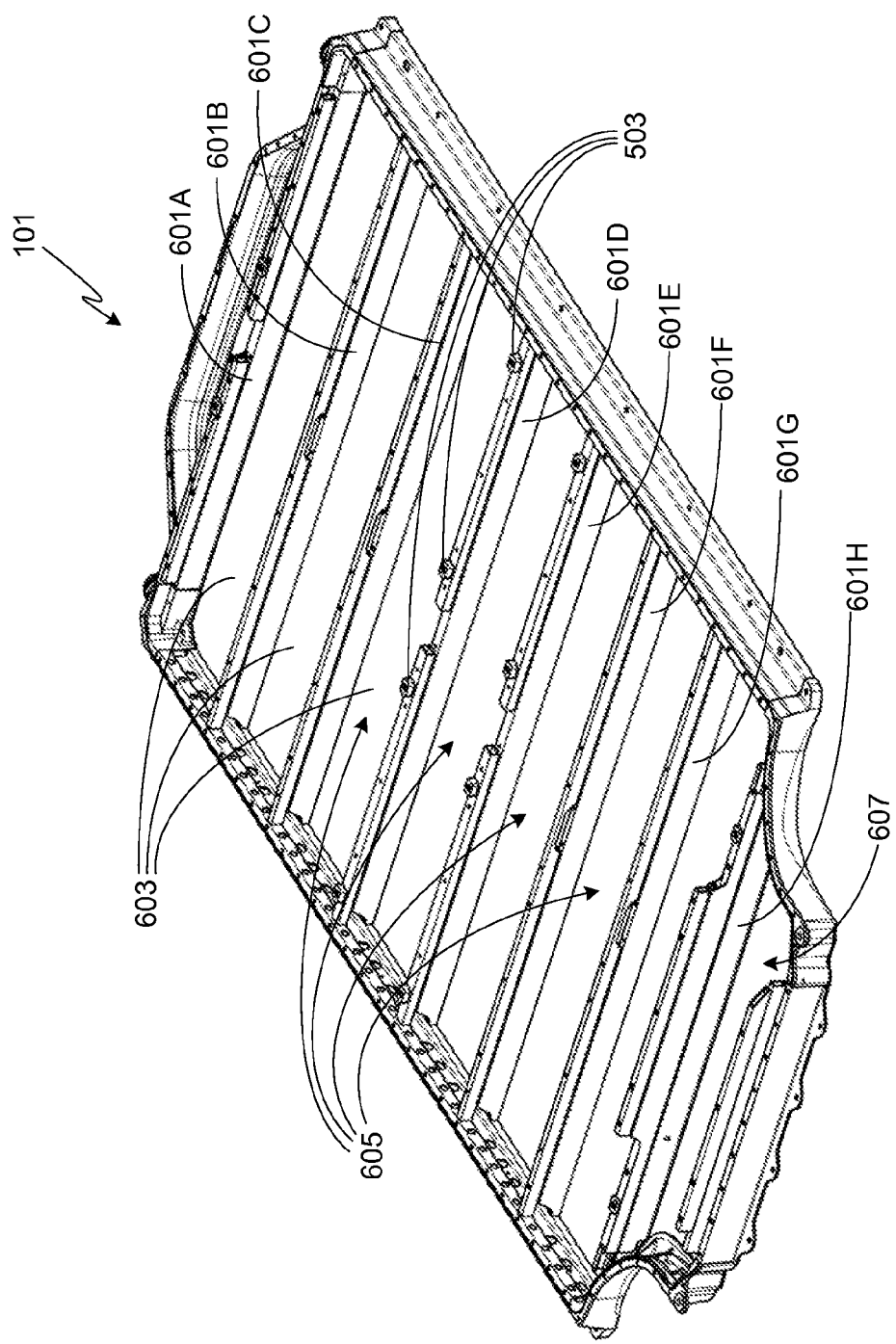
FIG. 6 provides a perspective view of the battery pack shown in FIGS. 1-5, with the top panel removed.

FIG. 6 shows battery pack 101 with top panel member 501 removed, this view showing multiple cross-members 601A-601H. The number of cross-members is based on the number of cells/cell modules that are to be contained within the battery pack as well as the desired structural characteristics of the battery pack. Preferably battery pack side members 405, including extended regions 407, battery pack top panel 501, battery pack bottom panel 603 and cross-members 601A-601H are each fabricated from a light weight metal, such as aluminum or an aluminum alloy, although other materials such as steel may be used for some or all of the battery pack components. Bottom panel 603 may be welded, brazed, soldered, bonded or otherwise attached to side members 405, with the resultant joint between panel 603 and member 405 preferably being substantially air-tight as well as being strong enough to allow bottom panel 603 to support the batteries contained within the pack. Top panel 501 is typically attached to members 405 using bolts or similar means, thus simplifying battery replacement as well as allowing battery interconnects, battery pack components, cooling system components and other battery pack components to be repaired and/or replaced.

Battery pack cross-members 601A-601H provide several benefits. First and foremost, cross-members 601A-601H provide mechanical and structural strength and rigidity to the battery pack, to the vehicle to which the battery pack is attached, and to the seat mount assemblies which are coupled to the battery pack and the battery pack cross-members. Additionally, cross-members 601A-601H help to segregate battery thermal events by providing a thermal barrier between groups of cells as well as minimizing gas flow between sections 605, sections 605 being defined by the battery pack cross-members, side members 405, top member 501 and bottom member 603. By segregating thermal events within smaller groups of cells, thermal runaway propagation is limited as is the potential for battery pack damage.

Figure 7:
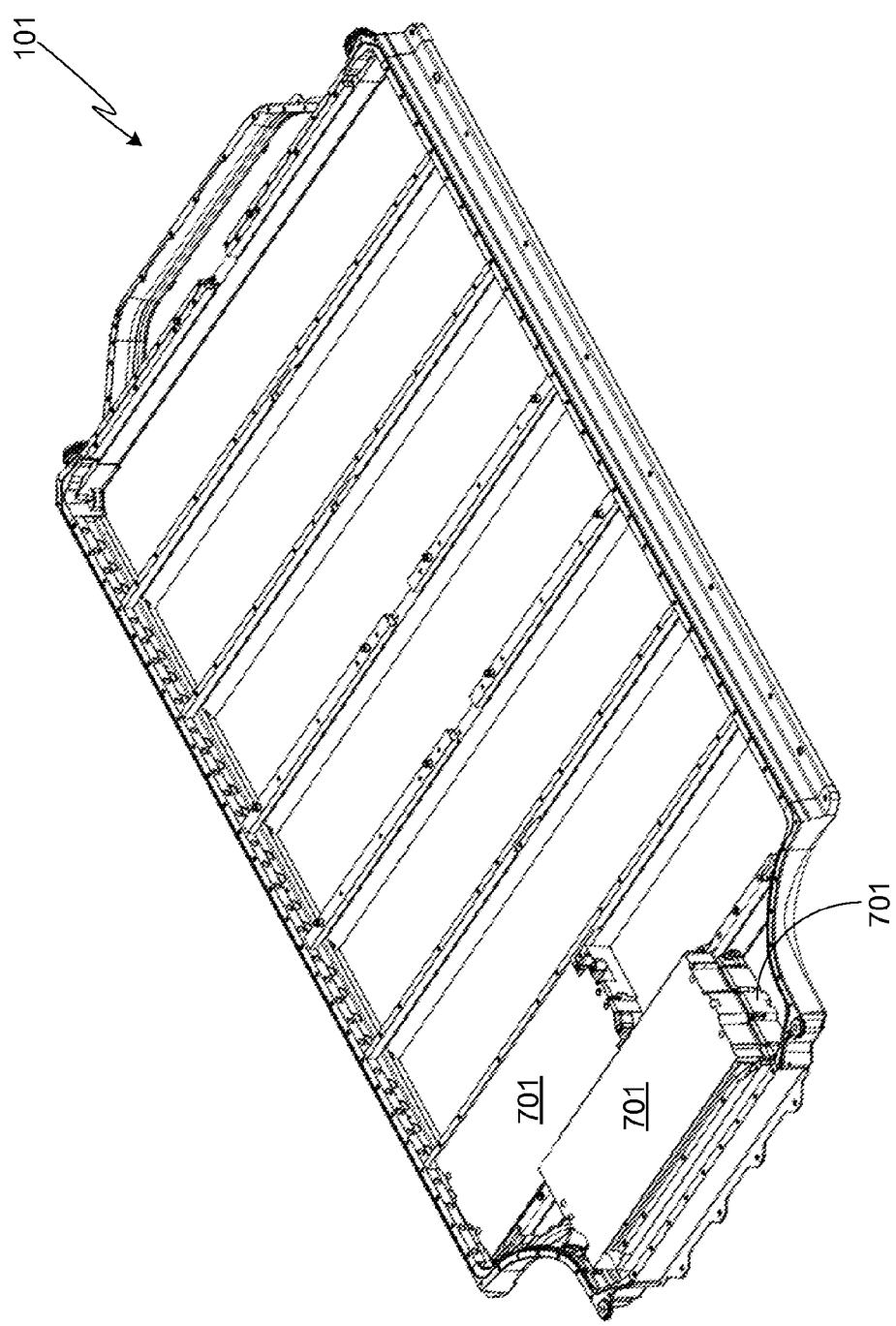
FIG. 7 provides a perspective view of the battery pack shown in FIGS. 1-6, this view showing three of the battery modules in place within the pack.

FIG. 7 shows a similar view to that provided by FIG. 6, with the inclusion of a couple of cell modules 701. In this illustration, a single module 701 is shown positioned within one of the seven, larger sections 605 of battery pack 101. Note that in the illustrated embodiment, each large section 605 is designed to house a pair of battery pack modules 701. Additionally, in this illustration there are two modules 701 stacked one on top of the other in the front section 607 of pack 101. Note that in the preferred embodiment, each module 701 contains 370 individual cells, each cell utilizing an 18650 form factor. It should be understood, however, that this configuration is only exemplary of a preferred embodiment and that the invention is equally applicable to other configurations, for example utilizing batteries with a different form factor, a larger or smaller number of cells, individual cells versus modules, different cell chemistries, etc.

Figure 8:
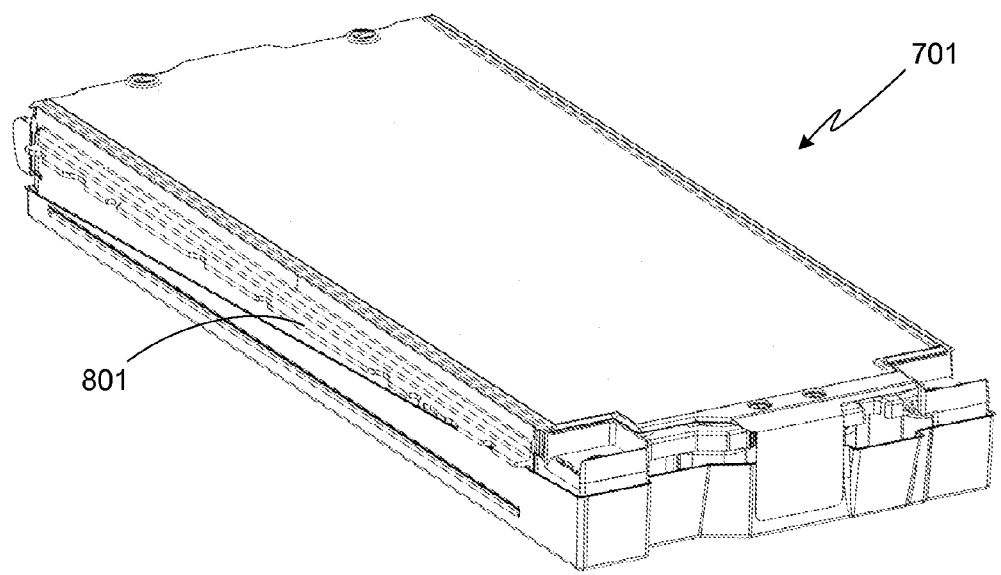
FIG. 8 provides a perspective views of a single battery module for use within the battery pack shown in FIGS. 1-7.
Figure 9:
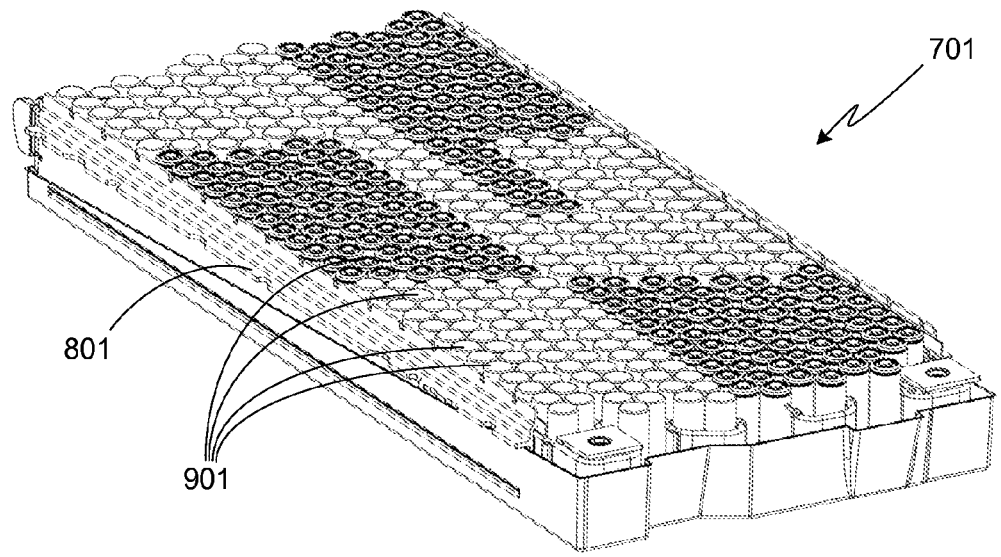
FIG. 9 illustrates the battery module shown in FIG. 8 with the upper module components removed.

As noted above, the present invention does not rely on a particular implementation of the battery pack enclosure and more specifically, does not rely on a particular implementation of the batteries and battery modules that are contained within the battery pack enclosure. Specific implementations of both are only provided herein to illustrate one preferred configuration. FIG. 8 provides a perspective view of a single module 701, this view highlighting the module mounting flange 801. In this configuration, mounting flanges 801 are located on either side of the module and, during battery pack assembly, are captured between upper and lower sections of each cross-member. FIG. 9 shows the previously illustrated battery module with the upper portion of module 701 removed as well as several of the upper module components (e.g., cell locator plate, current collector plate, etc.), thus making the individual cells 901 visible. Note that the orientation of cells 901 within module 701 varies.

Figure 10:
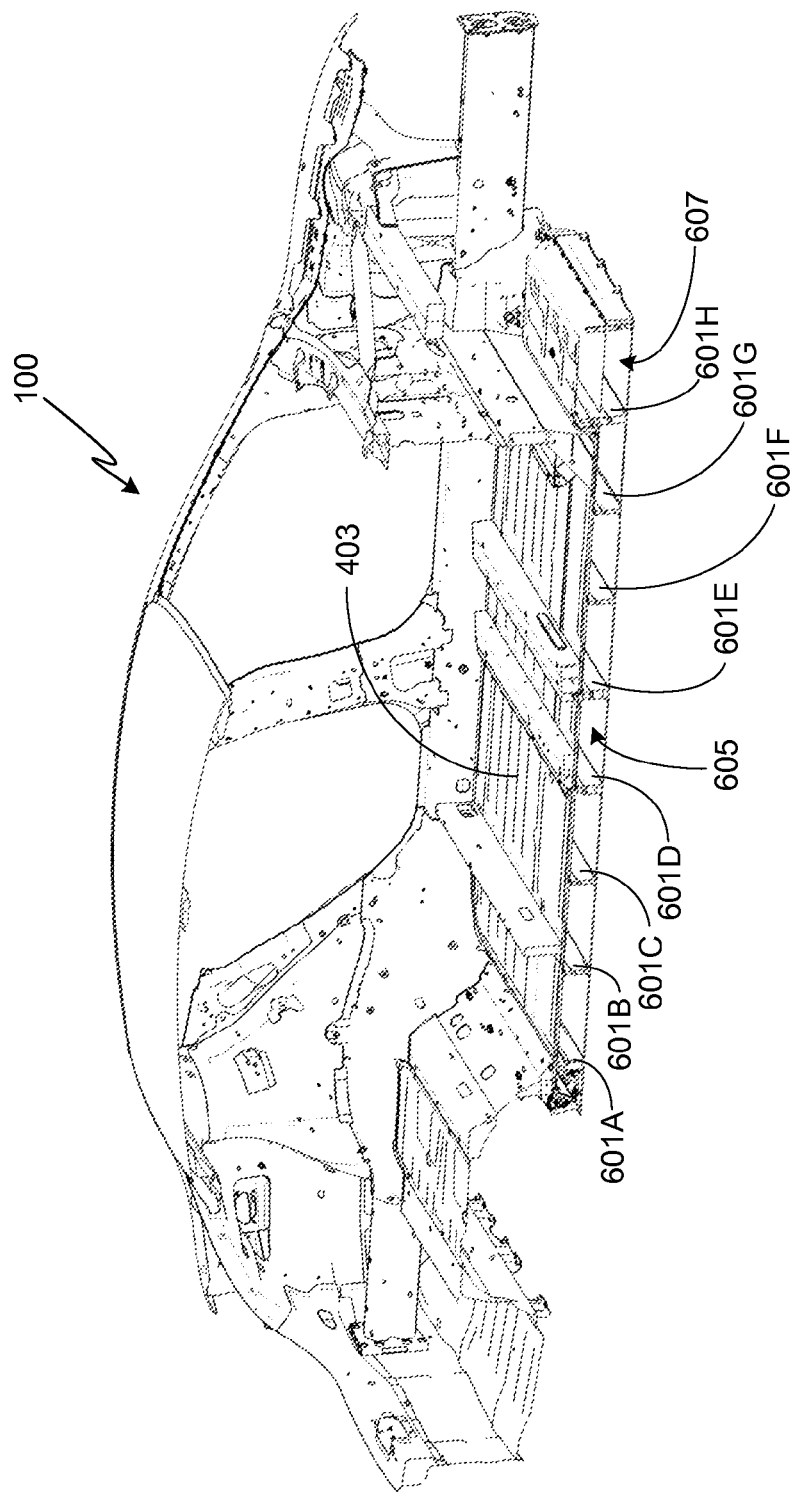
FIG. 10 provides a perspective, cross-sectional view of the battery pack shown in FIGS. 1-7 mounted under the floor panel of the vehicle shown in FIG. 1.

FIG. 10 provides a perspective, cross-sectional view of battery pack 101 mounted under floor panel 403 of vehicle 100. This view also provides additional views of the cross-members. Note that in this figure the batteries/battery modules are not shown within the battery pack, thus simplifying the figure in order to better illustrate the basic battery pack/vehicle assembly and configuration.

As shown in the cross-sectional view of FIG. 10, preferably battery pack cross-members 601A-601H do not utilize the same cross-section; rather the cross-section of each is optimized for that particular member's location within the pack. In general, battery pack cross-members 601A-601H may either be comprised of a single unit or as preferred, comprised of an upper section and a lower section, thus providing a convenient means of capturing and mounting the battery modules 701. One or both sections of each cross-member may be hollow, thus minimizing weight while still providing a rigid and strong structural member. It should be understood that not only can the configuration/design of the cross-members vary, depending upon their location within the pack, so can the materials comprising the cross-members. Therefore while cross-members 601A-601H are preferably fabricated from aluminum or an aluminum alloy, for example using an extrusion process, other materials (e.g., steel, ceramics, etc.) may also be used if such materials fit both the mechanical and thermal goals for the particular cross-member in question. Additionally, the lumens within one or more of the cross-members may be unfilled or filled, for example filled with a high melting temperature, low thermal conductivity material (e.g., fiberglass or similar material). Alternately, the lumens within the cross-members may include a liquid (e.g., water), the liquid being either stagnant or flowing. If stagnant, the liquid may be contained within the lumens themselves or, as preferred, contained within pouches that fit within the cavities. If the liquid is flowing, it is preferably contained within tubing that is inserted within the cross-member cavities and either coupled to a battery cooling system or used in a stand-alone circulation system.

Preferably and as illustrated in FIG. 10, cross-members 601D and 601E are larger than the other central cross-members. The reason for the increased size for these particular cross-members is to provide additional cross-member strength at those locations that are both used for seat mounting assemblies and are considered critical to resisting side impact loads that may be encountered during a collision.

Figure 11:
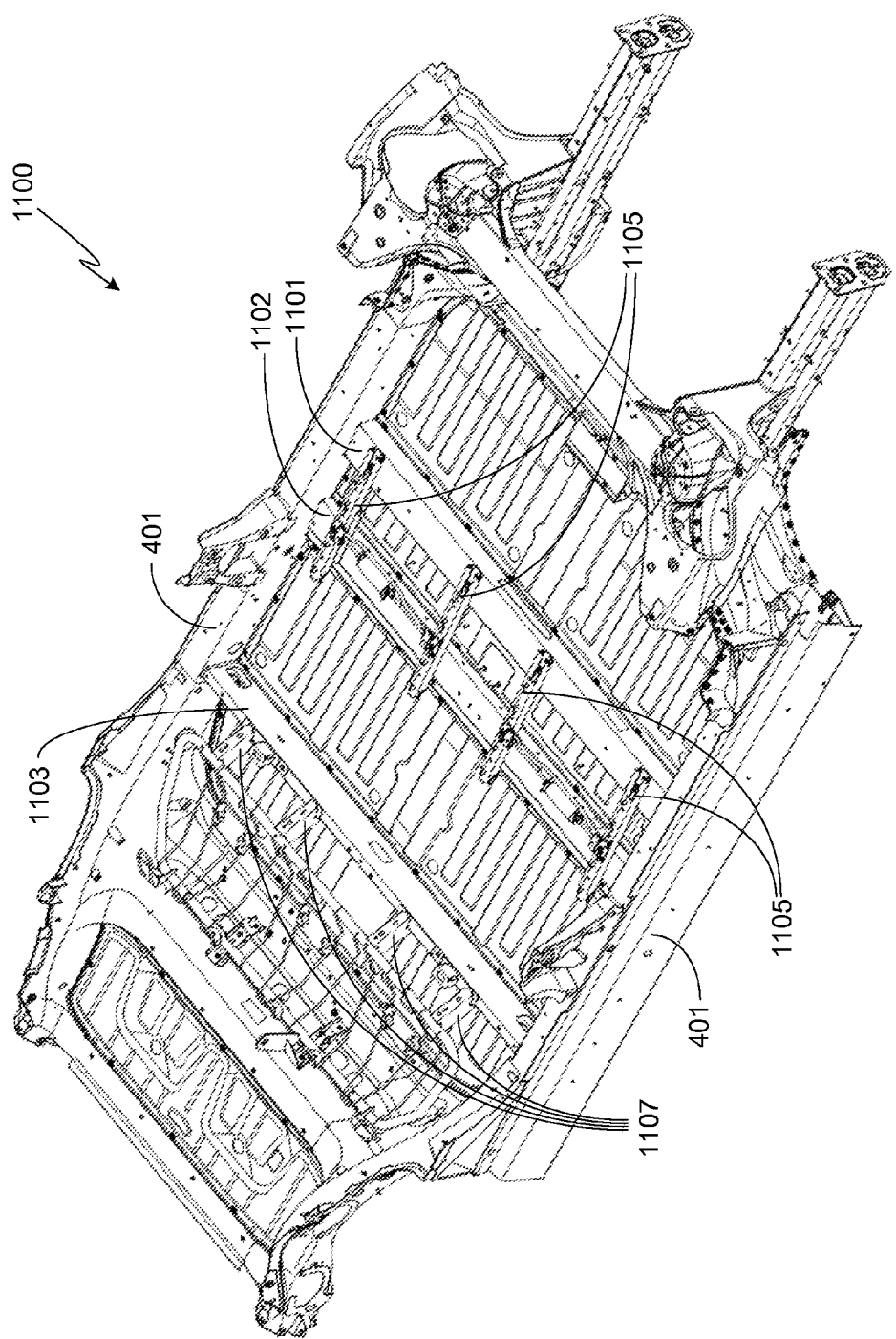
FIG. 11 provides a detailed perspective view of the primary mechanical structural elements of the underbody.

FIG. 11 provides a detailed perspective view of the primary mechanical structural elements of the underbody 1100. This view shows the three body cross-members 1101-1103 to which the seat assemblies are attached. Body cross-members 1101-1103 are preferably welded to side sills 401. As shown, front seat rails 1105 are attached to body cross-members 1101 and 1102. In the illustrated vehicle configuration, the rear seat bench assembly is attached to body cross-member 1103 utilizing a plurality of structural members 1107. In this embodiment, the rear seat bench assembly is also attached to the rear torque box.

In order to enhance the overall performance of the seat assemblies, specifically the rigidity and strength of the seat mounts, the body cross-members are mechanically coupled to the battery pack cross-members as described below. Enhancing the strength and rigidity of the body cross-members, especially at locations adjacent to the seat mounts, dramatically enhances the performance of the seat assemblies. Additionally, the disclosed assembly provides a convenient means of providing further support to the middle of battery pack 101, specifically by mechanically coupling the battery pack and the internal battery pack cross-members contained therein to the body cross-members that are preferably welded to the vehicle side sills.

Figure 12:
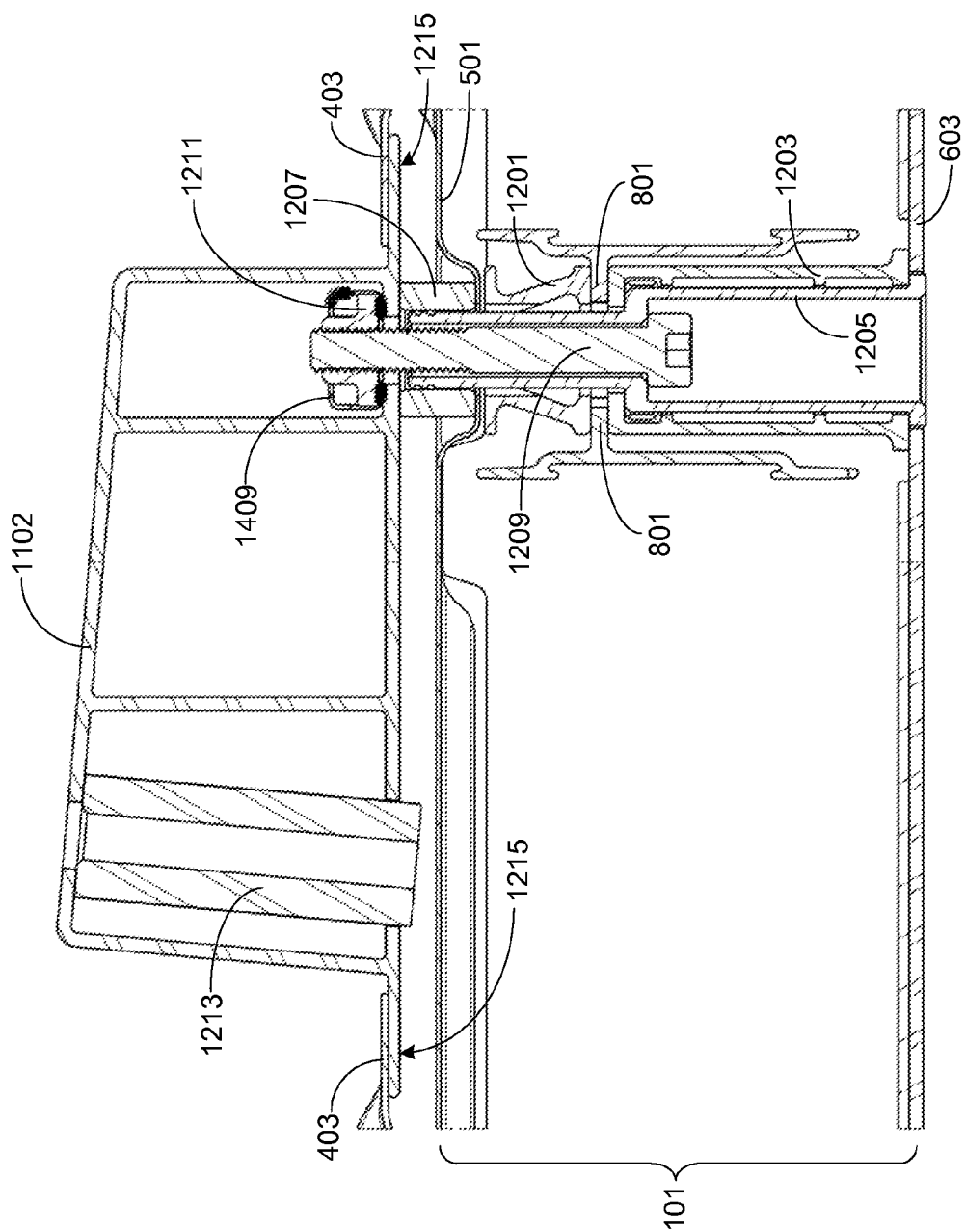
FIG. 12 provides a detailed cross-sectional view of the assembly used to mechanically couple the body cross-members to the battery pack cross-members.
Figure 13:
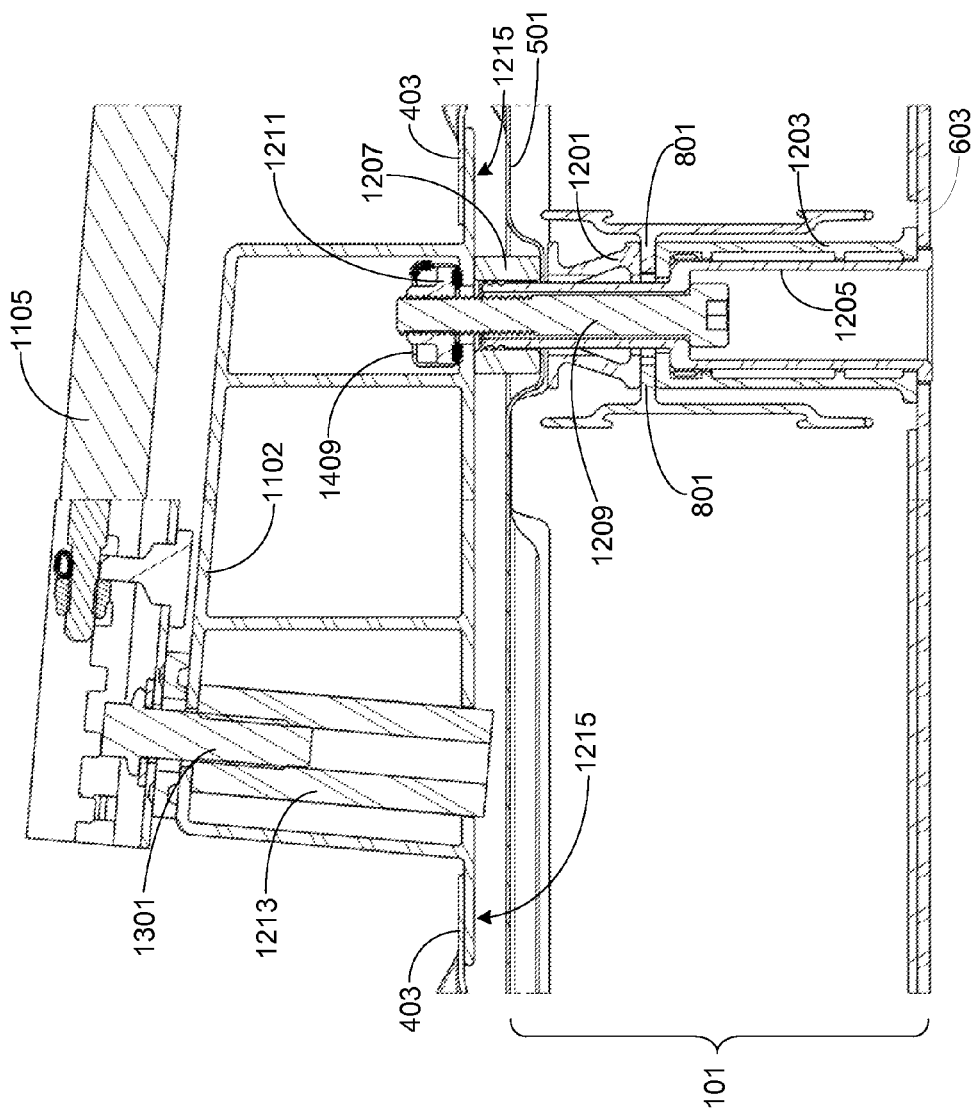
FIG. 13 provides a similar view to that provided by FIG. 12, with the addition of a portion of the seating rail.
Figure 14:
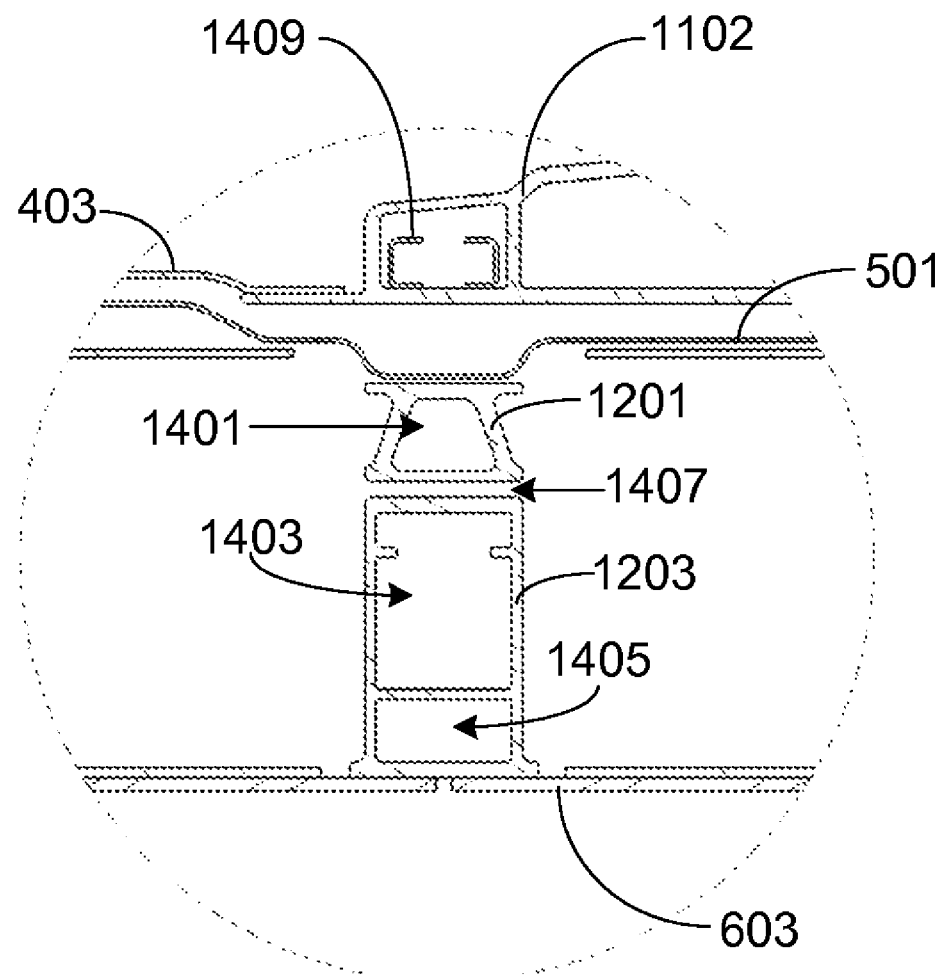
FIG. 14 provides a detailed cross-sectional view of a different portion of the battery pack and body/pack cross-members.

FIGS. 12 and 13 illustrate the preferred approach to mechanically coupling the body cross-members to the battery pack in order to enhance body cross-member strength and rigidity. It should be understood, however, that this is simply one approach to coupling the body cross-members to the underlying battery pack 101 and that other methods are clearly anticipated by the inventors. FIG. 12 is a cross-sectional view of a portion of the battery pack 101, cross-member 1102 and a portion of the vehicle floor panel 403. FIG. 13 provides a similar view with the addition of a portion of a seating rail 1105. FIG. 14 provides a different view of the battery pack and body/pack cross-members.

In the preferred and illustrated embodiment, each battery pack cross-member 601A-601H is preferably comprised of an upper member 1201 and a lower member 1203. As illustrated, preferably upper member 1201 is attached to battery pack top panel 501 and includes a single lumen 1401, and lower member 1203 is attached to battery pack bottom panel 603 and includes a pair of lumens 1403 and 1405. The lumens (also referred to herein as cavities) may be filled or unfilled as noted above. The use of upper and lower members for each of the battery pack cross-members 601A-601H provides a convenient means for holding the battery modules in place, specifically by capturing the module mounting flanges 801 within region 1407 during battery pack assembly.

In the locations where a body cross-member is attached to the battery pack, preferably a sleeve 1205 is inserted into the battery pack, sleeve 1205 passing through the battery pack cross-member as shown. Sleeve 1205, which is preferably fabricated from aluminum, an aluminum alloy or steel, provides additional strength to the mount as well as providing a convenient method of providing a seal to insure that water, debris or other contaminants do not enter into the battery pack at the mounting location. Sleeve 1205 may be welded, brazed, soldered, bonded or otherwise attached to bottom battery pack panel 603. A spacer 1207 is located on the upper portion of sleeve 1205. In this embodiment, spacer 1207 is used to properly locate body cross-member 1102 relative to the top panel 501 of battery pack 101. Additionally, spacer 1207 may be threaded onto the upper portion of sleeve 1205. Alternately, spacer 1207 may be mechanically coupled to top battery pack panel 501, for example via welding, brazing, soldering or bonding. Regardless of the means used to mechanically couple spacer 1207 to the assembly, preferably it provides an upper assembly seal to insure that water, debris or other contaminants do not enter into the battery pack at the body cross-member mount.

Bolt 1209 is inserted through sleeve 1205 from under battery pack 101. The body cross-member, i.e., member 1102 in the illustrated embodiment, is mechanically coupled to the battery pack in general, and the battery pack cross-members in particular, using a nut 1211 with bolt 1209. Preferably nut 1211 is held in place by a retaining member 1409.

A threaded sleeve 1213 is coupled to the body cross-member, e.g., cross-member 1102, for example via welding, brazing, soldering or bonding. As shown in FIG. 13, seat rail 1105 is bolted to the body cross-member in general, and mounting sleeve 1213 in particular, using bolt 1301.

Note that in the preferred and illustrated configuration, vehicle floor panels 403 are mounted on top of body cross-member flanges 1215. Floor panels 403 are preferably bonded and riveted to body cross-member flanges 1215 although other means of coupling the two may be used (e.g., welding, brazing, soldering, bolting, etc.).

In at least one embodiment, vehicle seat belts are also attached to the body cross-members and therefore indirectly attached to the battery pack cross-members. Alternately, vehicle seat belts may be attached to the seat mounting assemblies, and therefore indirectly attached to both the body cross-members and the battery pack cross-members.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A vehicle seat mounting assembly, comprising:
   a battery pack enclosure mounted under an electric vehicle, said battery pack enclosure comprising an enclosure top panel, an enclosure bottom panel, and a plurality of enclosure side members, wherein said battery pack enclosure is configured to hold a plurality of batteries, said battery pack enclosure mounted between and mechanically coupled to a first vehicle structural side member located adjacent to a first side of said vehicle and a second vehicle structural side member located adjacent to a second side of said vehicle, wherein said battery pack enclosure is mounted under a passenger cabin floor panel, wherein said battery pack enclosure further comprises a plurality of battery pack cross-members integrated into said battery pack enclosure, wherein each of said plurality of battery pack cross-members transverses the distance between a first enclosure side member adjacent to said first vehicle structural side member and a second enclosure side member adjacent to said second vehicle structural side member, and wherein said plurality of battery pack cross-members segregate said plurality of batteries into groups of batteries;
   at least one body cross-member, wherein said at least one body cross-member is mounted between and mechanically coupled to a third vehicle structural side member located adjacent to said first side of said vehicle and a fourth vehicle structural side member located adjacent to said second side of said vehicle, and wherein said at least one body cross-member is mechanically coupled to a corresponding battery pack cross-member; and
   a plurality of vehicle seat mounts mechanically coupled to said at least one body cross-member, wherein at least one vehicle seat is mechanically attached to said plurality of vehicle seat mounts.

2. The vehicle seat mounting assembly of claim 1, said first vehicle structural side member comprising a left side rocker panel, and said second vehicle structural side member comprising a right side rocker panel.

3. The vehicle seat mounting assembly of claim 1, wherein each of said plurality of enclosure side members further comprise a mounting flange that is mechanically coupled to said first and second vehicle structural side members using a plurality of bolts.

4. The vehicle seat mounting assembly of claim 1, said third vehicle structural side member comprising a left side rocker panel, and said fourth vehicle structural side member comprising a right side rocker panel.

5. The vehicle seat mounting assembly of claim 4, wherein said at least one body cross-member is welded to said left and right rocker panels.

6. The vehicle seat mounting assembly of claim 1, said first vehicle structural side member and said third vehicle structural side member comprising a left side rocker panel, and said second vehicle structural side member and said fourth vehicle structural side member comprising a right side rocker panel.

7. The vehicle seat mounting assembly of claim 1, wherein said at least one body cross-member is mechanically coupled to said corresponding battery pack cross-member using a plurality of bolts, wherein said plurality of bolts pass through said corresponding battery pack cross-member.

8. The vehicle seat mounting assembly of claim 7, further comprising a plurality of metal sleeve members, said plurality of bolts inserted through said plurality of metal sleeve members, wherein said plurality of metal sleeve members pass through said corresponding battery pack cross-member and extend from said enclosure bottom panel to said enclosure top panel.

9. The vehicle seat mounting assembly of claim 8, wherein each of said plurality of metal sleeve members is welded, brazed, soldered or bonded to said enclosure bottom panel.

10. The vehicle seat mounting assembly of claim 8, further comprising a plurality of spacers corresponding to said plurality of metal sleeve members, wherein said plurality of spacers are interposed between said battery pack enclosure and said at least one body cross-member.

11. The vehicle seat mounting assembly of claim 1, wherein said at least one body cross-member further comprises a plurality of threaded sleeve members, and wherein said plurality of vehicle seat mounts are mechanically coupled to said plurality of threaded sleeve members using a plurality of bolts.

12. The vehicle seat mounting assembly of claim 11, wherein each of said plurality of threaded sleeve members is welded, brazed, soldered or bonded to said at least one body cross-member.

13. The vehicle seat mounting assembly of claim 1, wherein each of said plurality of vehicle seat mounts comprise a vehicle seat rail.

14. The vehicle seat mounting assembly of claim 1, further comprising at least one vehicle seat belt mechanically coupled to said at least one body cross-member.

15. The vehicle seat mounting assembly of claim 1, further comprising at least one vehicle seat belt mechanically coupled to at least one of said plurality of vehicle seat mounts.

16. The vehicle seat mounting assembly of claim 1, wherein each of said plurality of battery pack cross-members is comprised of an upper member and a lower member.

17. The vehicle seat mounting assembly of claim 16, wherein said upper member of each of said plurality of battery pack cross-members includes at least one cavity extending an entire upper member length, and wherein said lower member of each of said plurality of battery pack cross-members includes at least one cavity extending an entire lower member length.

18. The vehicle seat mounting assembly of claim 16, wherein said upper member of each of said plurality of battery pack cross-members is mechanically coupled to said enclosure top panel, and wherein said lower member of each of said plurality of battery pack cross-members is mechanically coupled to said enclosure bottom panel.

19. The vehicle seat mounting assembly of claim 1, wherein each of said plurality of battery pack cross-members is fabricated from a material selected from the group of materials consisting of aluminum, aluminum alloys and steel.

20. The vehicle seat mounting assembly of claim 1, wherein said enclosure bottom panel, said enclosure top panel, and said plurality of enclosure side members are each fabricated from a material selected from the group of materials consisting of aluminum, aluminum alloys and steel.

21. The vehicle seat mounting assembly of claim 1, wherein said enclosure bottom panel is welded, brazed, soldered or bonded to said plurality of enclosure side members, and wherein said enclosure top panel is bolted to said plurality of enclosure side members.

22. The vehicle seat mounting assembly of claim 1, said passenger cabin floor panel comprising a plurality of floor panels, wherein at least a portion of said plurality of floor panels are mechanically coupled to an upper surface of a floor panel mounting flange of said at least one body cross-member.

23. The vehicle seat mounting assembly of claim 1, wherein said battery pack enclosure is substantially airtight.

* * * * *